United States Patent [19]

Yamada et al.

[11] Patent Number: 5,117,918

[45] Date of Patent: Jun. 2, 1992

[54] CULTIVATOR BLADE SUPPORTING STRUCTURE

[75] Inventors: Tohru Yamada; Sadao Doi; Tomiji Oguri; Taizo Yamamoto, all of Kouchi, Japan

[73] Assignee: Taiyo Tanko Co. Ltd., Japan

[21] Appl. No.: 575,209

[22] Filed: Aug. 30, 1990

[30] Foreign Application Priority Data

Sep. 1, 1989 [JP] Japan .................. 1-224707

[51] Int. Cl.$^5$ .................. A01B 33/14; A01B 35/28
[52] U.S. Cl. .................. 172/96; 172/123; 172/762; 403/361; 403/383
[58] Field of Search .............. 172/681, 747, 762, 772, 172/763, 123, 91, 96; 403/361, 378, 379, 404, 406.1, 383, 359

[56] References Cited

U.S. PATENT DOCUMENTS

| 2,054,129 | 9/1936 | Kelsey | 172/96 |
|---|---|---|---|
| 3,198,262 | 8/1965 | Robinson. | |
| 3,199,609 | 10/1965 | Robinson | 172/556 |
| 3,246,704 | 4/1966 | Houda et al. | 172/96 |
| 4,681,307 | 7/1987 | Leonard | 403/383 |
| 4,697,644 | 10/1987 | Doi et al. | 403/361 |

FOREIGN PATENT DOCUMENTS 0196545 8/1986 European Pat. Off. .
2356767 6/1977 France .

Primary Examiner—Dennis L. Taylor
Assistant Examiner—Spencer Warnick
Attorney, Agent, or Firm—Samuels, Gauthier & Stevens

[57] ABSTRACT

There is provided a cultivator blade supporting structure including at least one cultivator blade having a shank and a blade portion, at least one blade holder having a cavity for removably receiving the shank of the cultivator blade, and a rotational driving shaft to which the blade holder is fixed, wherein at least a part of the cavity is defined by first confronting oppositely inclined interior surfaces and second confronting oppositely inclined interior surfaces which have a different inclination angle from the first inclined interior surfaces, so that contact portions of the shank are wedged between and into the first and second inclined interior surfaces when the rotational shaft rotates to cultivate the ground.

11 Claims, 7 Drawing Sheets

CULTIVATOR BLADE SUPPORTING STRUCTURE

BACKGROUND OF THE INVENTION

1. Field of the Invention

The present invention relates to a cultivator blade supporting structure, in which a cultivator blade can be firmly and reliably supported in the blade holder and can be easily attached to and removed from the blade holder.

2. Description of the Prior Art

Blades of a cultivator are fitted to the cultivator by inserting a shank located at one end of each blade into each of a plurality of blade holders projecting from the periphery of a rotational shaft for rotating the blades. As required, all the blades attached to the blade holders are removed and replaced with other blades which have different blade shapes.

FIGS. 1 and 2 show a prior art cultivator blade supporting structure. On a periphery 2 of a rotational shaft 1 for rotating a cultivator blade 5, there projects a blade holder 3. The cross section of the blade holder 3 perpendicular to an axis Y—Y of the blade holder 3 forms a generally rhombic shape by welding the two members 3a and 3b at portions "c". Into a cavity 4, a shank 6 located at one end of a cultivator blade 5 is inserted. The cross section of the shank 6 has a rhombic shape in accordance with the cross section of the blade holder 3. The shank 6 is fitted to the blade holder 3 with a stopper pin 7 which extends in parallel relationship with the rotational shaft 1 through the blade holder 3. The shank 6 of the cultivator blade 5 is rotatable around the pin 7.

When the rotational shaft 1 rotates in a direction indicated by an arrow "m" shown in FIG. 3 to cultivate the ground, the cultivator blade 5 is bodily rotated in the same direction. When the inner side of the other end (not shown) of the cultivator blade 5 hits the ground, the cultivator blade 5 is turned in a direction indicated by an arrow "n" around the pin 7 due to the reaction force from the ground. As a result, the shank 6 in the cavity 4 is turned with respect to the blade holder 3 in a direction opposite to the rotating direction of the rotational shaft 1. The upper end of the shank 6 (FIG. 3) is moved upwardly toward an upper internal portion "b" of the cavity 4, while a lower end of the shank 6 on the blade side is moved toward a lower face portion "a" of the cavity 4. At both end portions, side faces of the shank 6 are wedged against internal side faces of the blade holder 3. When a large external force is applied to the cultivator blade 5, the contacting points of the side faces of the shank 6 and the internal side faces of the blade holder 3 are gradually increased to make planar contact due to the resilient deformation of the blade holder 3.

In the above mentioned situation, according to the increase of the area of planar contact, the cultivator blade 5 must be struck in the direction of arrow "z" in FIG. 3 to dislodge the shank 6 from the cavity 4. However, when this is done, the shank 6 is forced past the neutral position shown in FIG. 1 to a wedged position as shown in FIG. 4. Thus, the cultivator blade 5 must be angularly reciprocated several times before it can be brought to the neutral position of FIG. 1, thereby enabling it to be removed from the blade holder 3.

In consideration of this problem, U.S. Pat. No. 4,697,644 shows improvements of the cultivator blade supporting structure. As shown in FIGS. 5 and 6, the prior art cultivator blade supporting structure comprises a cultivator blade 15 comprising a shank 16 and a blade portion 18; a blade holder 13 having an elongated cavity 14 for removably receiving the shank 16 of the cultivator blade 15; and a rotational shaft 1 to which the blade holder 13 is fixed.

The blade holder 13 is constituted by overlapping the upper and lower end faces of one channel-like member 13a with the upper and lower end faces of another channel-like member 13b, wherein the channel-like members 13a and 13b are formed by processing rolled steel for general structure. The peripheral ends of the blade holder 13 are formed solidly with welded portions "c". The cavity 14 for receiving the shank 16 of the cultivator blade 15 is defined by confronting oppositely inclined interior surfaces 20 and 21. That is, the thickness of the side walls of the blade holder 13 becomes thinner from the overlapped end faces toward pin holes 22 which are provided at an intermediate height in symmetrical position on the right and left side faces of the blade holder 13. The intermediate body of the shank 16 on the right and left side portions are formed with parallel surfaces. The upper and lower ends of the parallel surfaces terminate at inclined surfaces 24 and 25 which have angles of inclination larger than those of the confronting oppositely inclined interior surfaces 20 and 21 of the blade holder 13. When a stopper pin 7 is inserted from the pin holes 22 of the blade holder 13 into a pin hole 26 of the shank 16, the shank 16 abuts the inclined interior surfaces 20 and 21 of the blade holder 13 at the contacting portions "c".

In operation, when the rotational shaft 1 rotates in a direction indicated by an arrow "m" shown in FIG. 5 to cultivate the ground, the cultivator blade 15 is rotated about the axis of the stopper pin 7 in a direction opposite to the direction of rotation of the shaft 1 due to the reaction force from the ground, such that the contacting portions "e" of the shank 16 is wedged between and into the inclined interior surfaces 20 and 21 of the blade holder 13 in point contact state. Thus, the cultivator blade 15 can be removed from the blade holder 13 in a short time in comparison with the planar contact state.

However, since the blade holder of the prior art structure is formed by processing rolled steel for general structure, which results in low tensile strength and elastic efficiency, the blade holder is liable to be destroyed when a high level of external force is applied to the cultivator blade. And, since the blade holder is formed by welding two channel-like members, the welded portions are liable to be cracked when a high level of external force is applied to the cultivator blade. In order to increase the strength of the blade holder and prolong the life time of the blade holder, it is required to thicken the walls of the blade holder, but this causes problems because the weight of the blade holder is substantially increased.

Furthermore, in the prior art structure, since the inclined interior surfaces of the blade holder are inclined at a gentle grade, the fitting pressure of the contacting portions of the shank and the inclined interior surfaces of the blade holder is not very strong. Thus, the cultivator blade cannot be firmly received in the blade holder if the reaction force is insufficient when the cultivator blade cultivates soft or muddy ground.

Moreover, since the inclined interior surfaces of the blade holder are inclined at a gentle grade, the contacting portions of the shank can be smoothly wedged into the inclined interior surfaces of the blade holder, thereby resiliently enlarging the blade holder at the intermediate height portions toward the axial direction of the stopper pin. Thus, the blade holder is liable to be cracked due to the resilient deformation when a large external force is applied to the cultivator blade.

SUMMARY OF THE INVENTION

Therefore, it is an object of the present invention to provide an improved cultivator blade supporting structure having high tensile strength and high elastic efficiency.

In order to accomplish this object, a blade holder for removably receiving the cultivator blade according to the present invention is formed as a single body by processing medium or high carbon steel or special steel which is superior to rolled steel for general structure in tensile strength and elastic efficiency.

Another object of the present invention is to provide an improved cultivator blade supporting structure in which the cultivator blade can be firmly and reliably supported in the blade holder and can be easily attached to and removed from the blade holder.

In order to accomplish the above objects, the cultivator blade supporting structure according to the present invention comprises a rotational shaft and a blade holder fixed to and extending radially from the shaft, the holder having an elongated cavity suitably dimensioned and configured to receive a shank of the cultivator blade therein. In addition, at least a part of the blade holder comprises first and second confronting oppositely inclined interior surfaces having different inclination angles such that contact portions of the shank are wedged between and into the first and second inclined interior surfaces when the rotational shaft rotates to cultivate the ground.

BRIEF DESCRIPTION OF THE DRAWINGS

These and other objects, features and advantages of the present invention will become apparent from the following description of the preferred embodiments taken in conjunction with the accompanying drawings in which.

DETAILED DESCRIPTION OF THE PREFERRED EMBODIMENTS

Figure 1:
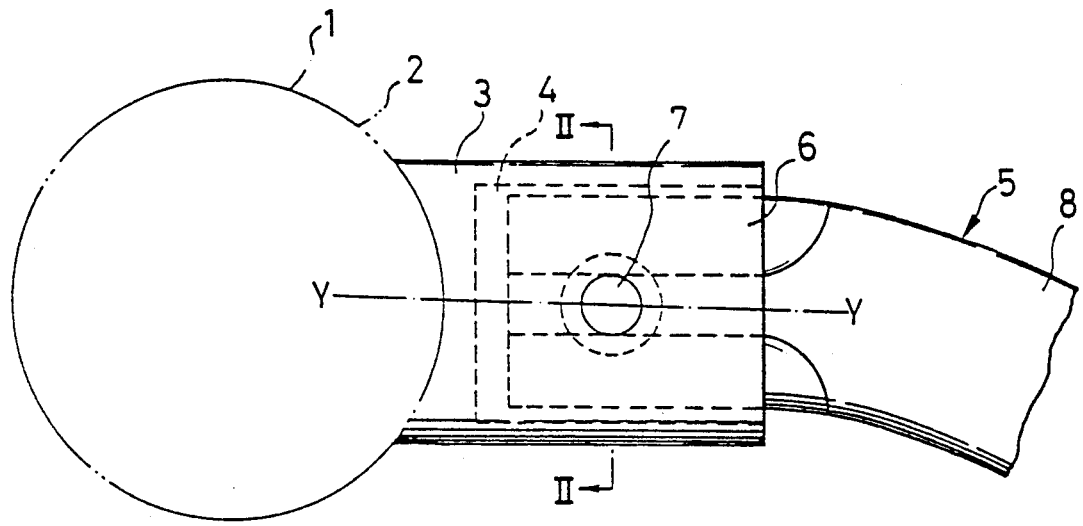
FIG. 1 is a side view showing a prior art blade holder.
Figure 2:
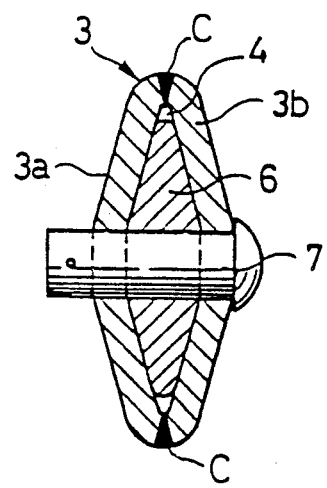
FIG. 2 is a cross-sectional view taken along the line II—II shown in FIG. 1.
Figure 3:
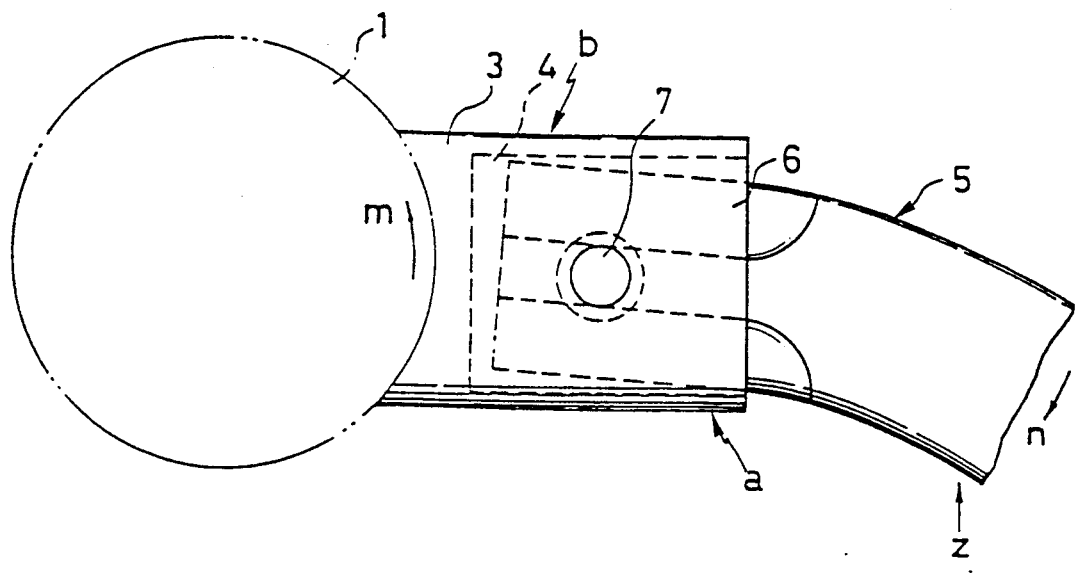
FIGS. 3 and 4 are views describing the operation of the prior art blade holder shown in FIG. 1.
Figure 4:
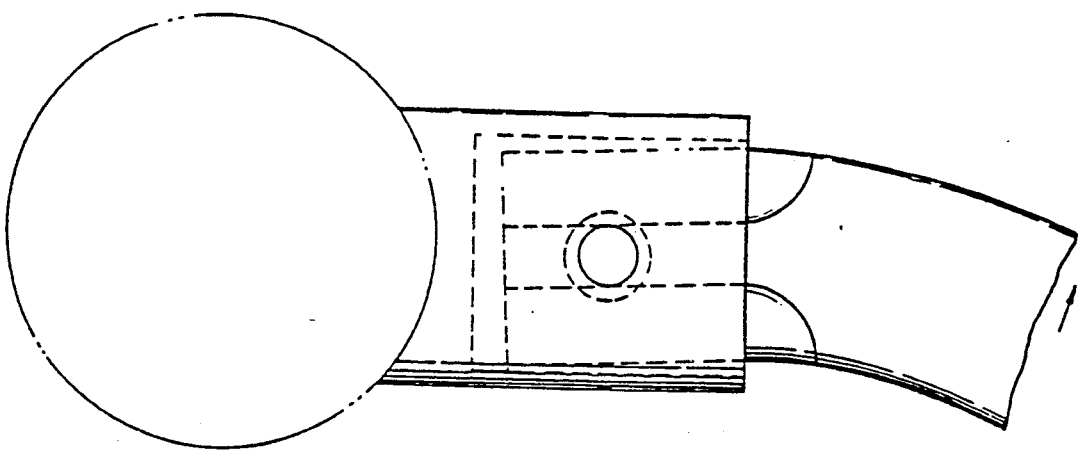
Figure 5:
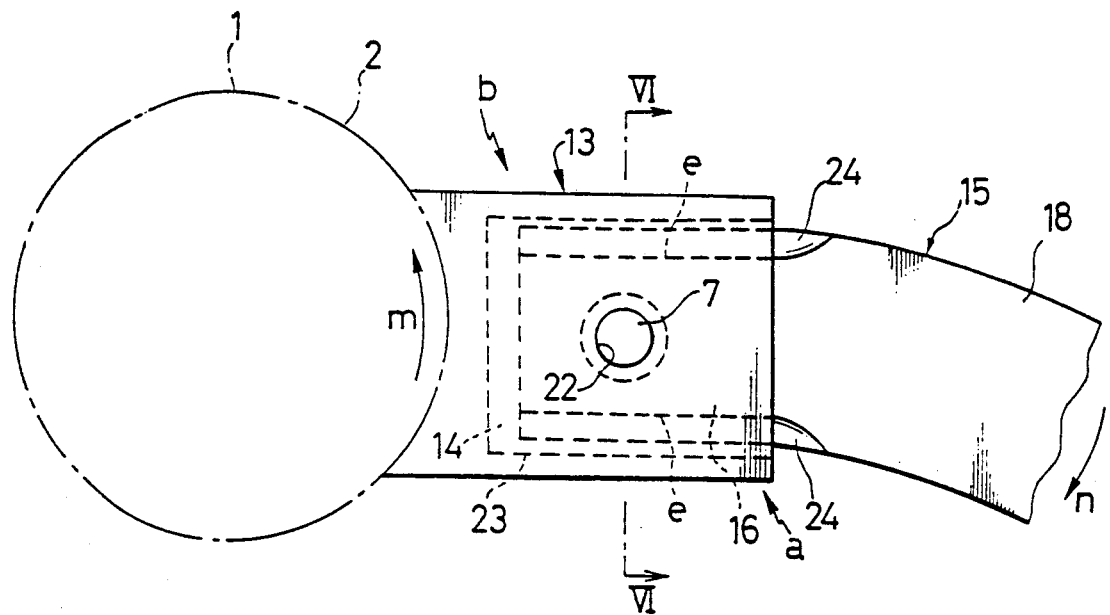
FIG. 5 is a side view showing another prior art blade holder.
Figure 6:
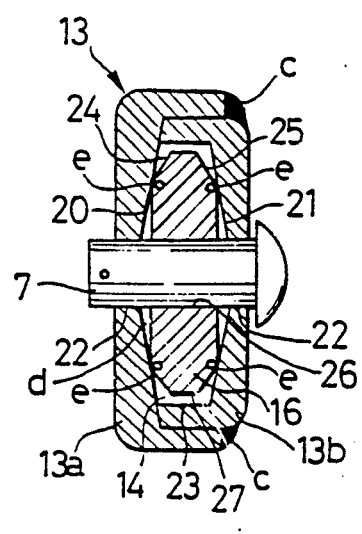
FIG. 6 is a cross-sectional view taken along the line VI—VI shown in FIG. 5.
Figure 7:
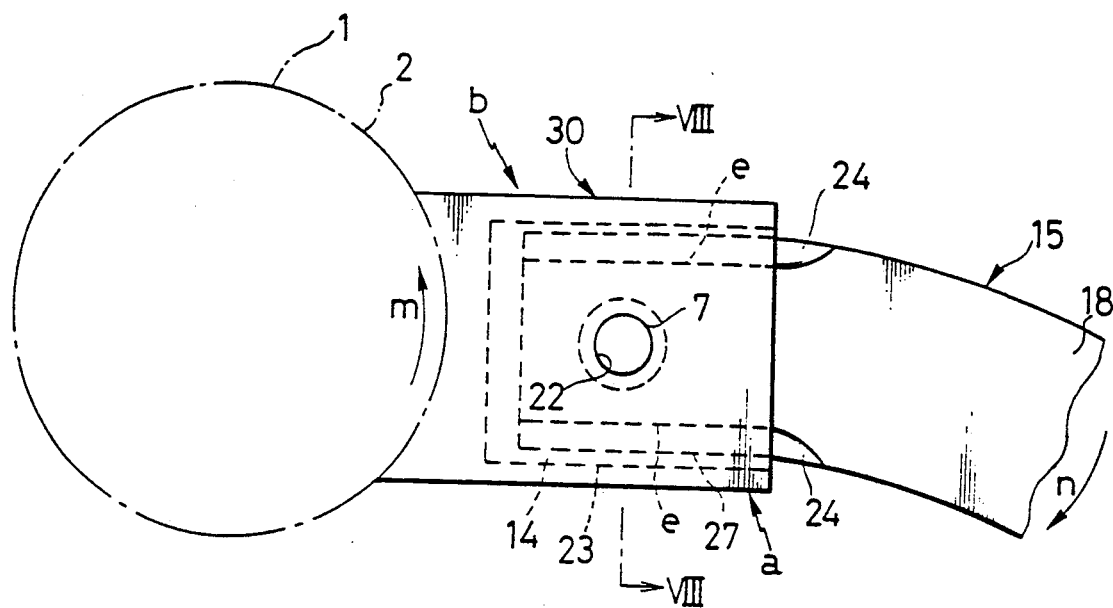
FIG. 7 is a side view showing a first embodiment of the present invention.
Figure 8:
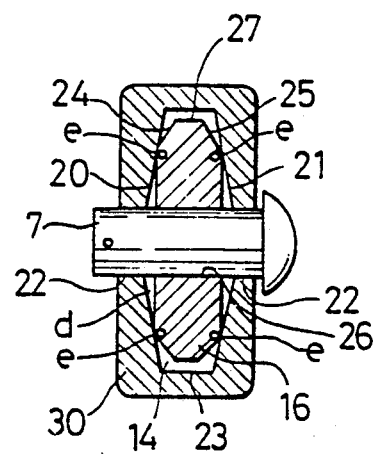
FIG. 8 is a cross-sectional view taken along the line VIII—VIII shown in FIG. 7.

Referring now to FIGS. 7 and 8, the numeral 1 denotes a cultivator rotational shaft. A periphery 2 of the rotational shaft 1 is provided radially with a plurality of blade holders 30 which are welded thereto and spaced properly apart from each other.

Each blade holder 30 is formed as a single body by processing medium or high carbon steel or special steel (steel including a special element, such as Si, Mn, Cr, Ni, V, etc.). In this embodiment, the blade holder 30 is formed by press-processing, for example, spring steel by hot working (700° C. or more) or warm working (200° C.-700° C.) with the use of special lubricants. Further, the blade holder 30 is hardened and tempered by heating and sudden cooling to improve toughness.

As shown in FIGS. 7 and 8, the blade holder 30 has an elongated cavity for removably receiving a shank 16 of a cultivator blade 15. The cavity 14 is defined by confronting oppositely inclined interior faces 20 and 21. That is, the thickness of the side walls of the blade holder 30 becomes thinner from the end faces toward pin holes 22 which are provided at an intermediate height in symmetrical position on the right and left side faces of the blade holder 30. The interior of the blade holder 30 is provided with stop surfaces 23 which are formed on faces being parallel with the pin holes 22 on the sides of the upper and lower end faces. The intermediate body of the shank 16 on the right and left side portions are formed with parallel surfaces which are spaced apart from the interior side faces of the blade holder 30 to form a gap "d". The upper and lower ends of the parallel surfaces terminate at inclined faces 24 and 25 which have angles of inclination larger than those of the confronting oppositely inclined interior surfaces 20 and 21 of the blade holder 30. The top and bottom ends of the shank 16 are formed in parallel surfaces 27, each having a width narrower than the width of the parallel stop surfaces 23. When a stopper pin 7 is inserted from the pin holes 22 of the blade holder 30 into the pin hole 26 of the shank 16, the shank 16 abuts the inclined interior surfaces 20 and 21 at portions "e".

In operation, when the rotational shaft 1 rotates in a direction indicated by the arrow "m" shown in FIG. 7 to cultivate the ground, the cultivator blade 15 is rotated about the axis of the stopper pin 7 in a direction indicated by the arrow "n" in FIG. 7 (that is, in the direction opposite to the direction of rotation of the shaft 1) due to the reaction force, such that the contacting portions "e" of the shank 16 are gradually wedged between and into the inclined interior surfaces 20 and 21 to form a point contact state.

In this situation, since the blade holder 30 is formed as a single body by processing spring steel which has high tensile strength and high elastic efficiency, and since the thickness of the walls of the center portions (adjacent to the pin holes 22) of the blade holder 30 is formed thinner, the blade holder 30 is resiliently enlarged along the axial direction of the stopper pin 37. When a high level of external force is applied, the upper and lower end surfaces 27 of the shank 16 abut the upper and lower stop surfaces 23 of the blade holder 30 to limit the extent of rotation of the shank 16 relative to the blade holder 30.

In this embodiment, since the blade holder 30 is formed as a single body by processing spring steel, the blade holder 30 has sufficient strength against large external forces applied to the cultivator blade 15. Thus, the lifetime of the blade holder can be prolonged.

Figure 9:
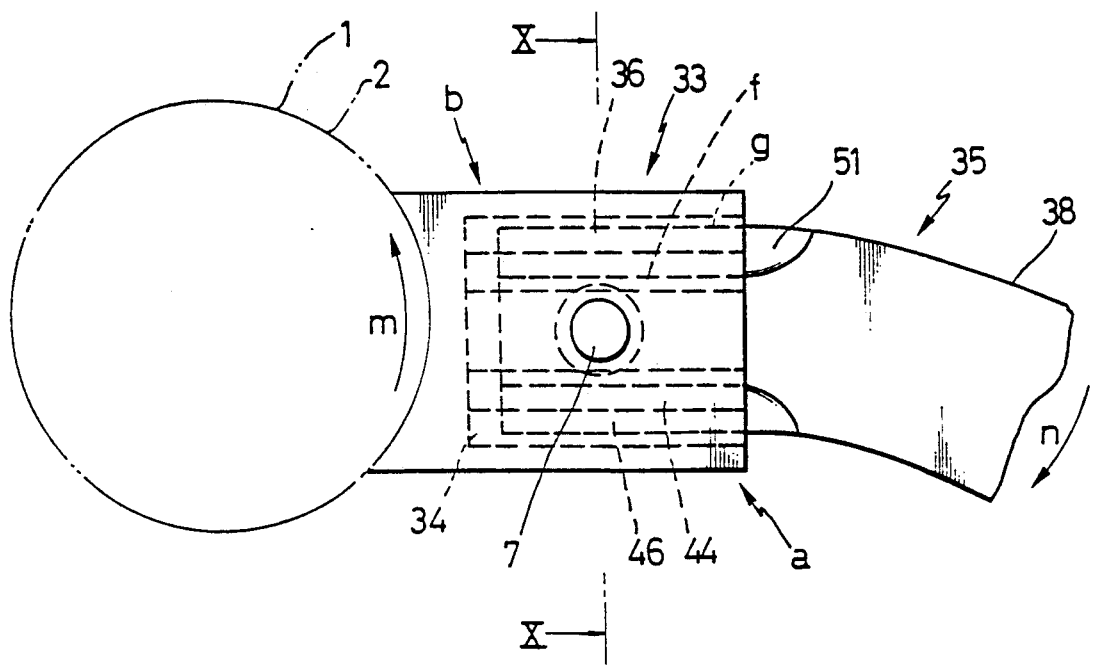
FIG. 9 is a side view showing a second embodiment of the present invention.
Figure 10:
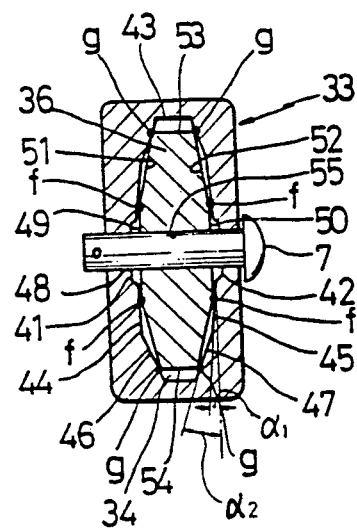
FIG. 10 is a cross-sectional view taken along the line X—X shown in FIG. 9.

FIGS. 9 and 10 show a second embodiment of the present invention. The numeral 1 denotes a cultivator rotational shaft. A periphery 2 of the rotational shaft 1 is provided radially with a plurality of blade holders 33 which are welded thereto and spaced properly apart from each other.

Each blade holder 33 is formed as a single body by processing medium or high carbon steel or special steel (steel including a special element, such as Si, Mn, Cr, Ni, V, etc.). In this embodiment, the blade holder 33 is formed by press-processing, for example, spring steel by hot working (700° C. or more) or warm working (200° C.-700° C.) with the use of special lubricants. Further, the blade holder 33 is hardened and tempered by heating and sudden cooling to improve toughness.

The numeral 34 is a cavity of the blade holder 33. The blade holder 33 has fitting pressure releasing portions 41 and 42 at an intermediate height in symmetrical positions on the right and left side faces of the blade holder 33. The blade holder 33 also includes a plurality of inclined interior side surfaces having different inclination angles so that the thickness of the side walls of the blade holder 33 becomes thicker from the fitting pressure releasing portions 41 and 42 toward the stop surfaces 43. In this embodiment, the blade holder 33 is provided with first confronting oppositely inclined interior surfaces 44 and 45 having a proper inclination angle $\alpha 1$ in the upper and lower directions from both ends of the fitting pressure releasing portions 41 and 42, and second confronting oppositely inclined interior surfaces 46 and 47 having a inclination angle $\alpha 2$ from the upper and lower end portions of the first inclined interior surfaces 44 and 45 toward the stop surfaces 43, with $\alpha 2 > \alpha 1$. The first inclined interior surfaces 44 and 45 and the second inclined interior surfaces 46 and 47 constitute the fitting pressure supporting portions with inclined surfaces 51 and 52 of a shank 36. Further, pin holes 48 for inserting a stopper pin 7 therein are provided at the center portions of the right and left sides of the blade holder 33.

The numeral 35 denotes a cultivator blade comprising the shank 36 and a blade portion 38. A pin hole 55 is provided at the center portion of the shank 36, which corresponds to the pin holes 48 of the blade holder 33.

The intermediate body of the shank 36 on the right and left side portions is formed with parallel side surfaces 49 and 50. The blade shank 36 has the inclined side surfaces 51 and 52 having a inclination angle which is larger than that of the first inclined interior faces 44 and 45 of the blade holder 33, but which is smaller than that of the second inclined interior faces 46 and 47 of the blade holder 33, from the upper and lower ends of the parallel surfaces 49 and 50 toward upper and lower end surfaces 53 and 54. The upper and lower end surfaces 53 and 54 of the blade shank 36 are formed parallel to the axis of the pin hole 55.

The shank 36 of the cultivator blade 35 is inserted into the cavity 34 of the blade holder 33, and the stopper pin 7 is inserted into the pin holes 48 of the blade holder 33 and the pin hole 55 of the shank 36 so that the cultivator blade 35 is removably fixed to the blade holder 33. A cotter pin (not shown) is fitted to the stopper pin 7 to prevent the accidental removal thereof. The shank 36, at first contacting portions "f" which are intersections of the parallel side surfaces 49 and 50 and the inclined side surfaces 51 and 52, abuts the first inclined interior surfaces 44 and 45 adjacent to the fitting pressure releasing portions 41 and 42 of the blade holder 33. Also, the shank 36, at second contacting portions "g" which are intersections of the inclined side surfaces 51 and 52 and the upper and lower end surfaces 53 and 54, abuts the second inclined interior surfaces 46 and 47 adjacent to the parallel stop surfaces 43 of the blade holder 33.

The operation of the second embodiment will be described hereinafter. A cultivator is driven to rotate the cultivator shaft 1 by a motor (not shown). When the cultivator blade 35 starts to cultivate the ground, the cultivator blade 35 receives a reaction force from the ground through the blade portion 38. As a result, the shank 36 is rotated around the stopper pin 7 relative to the blade holder 33 in a direction indicated by the arrow "n" in FIG. 9 so that the first contacting portions "f" and the second contacting portions "g" on the lower face side "a" are pressed against the first inclined interior surfaces 44 and 45 and the second inclined interior surfaces 46 and 47, respectively, and the first contacting portions "f" and the second contacting portions "g" on the upper back side "b" are pressed against the first inclined interior surfaces 44 and 45 and the second inclined interior surfaces 46 and 47, respectively. In this situation, since the inclination angle of the second inclined interior surfaces 46 and 47 is larger than that of the first inclined interior surfaces 44 and 45, the fitting pressure to the second inclined interior surfaces 46 and 47 at the second contacting portion "g" is larger than the fitting pressure to the first inclined interior surfaces 44 and 45 at the first contacting portion "f". Thus, even if the reaction force to the cultivator blade 35 is insufficient when the cultivator blade 35 cultivates soft or muddy ground, the cultivator blade 35 can be strongly and reliably supported in the blade holder 33.

Due to the reaction force, the first contacting portions "f" and the second contacting portions "g" of the shank 36 are gradually wedged into the first inclined interior surfaces 44 and 45 and the second inclined interior surfaces 46 and 47, respectively. In this situation, since the thickness of walls of the center portions (adjacent to the pin holes 48) of the blade holder 33 is formed thinner, the blade holder 33 is resiliently enlarged along the axial direction of the stopper pin 7 so that the looseness between the stopper pin 7 and the blade holder 33 is removed. Thus, the shank 36 can be strongly and reliably supported in the blade holder 33 without using fasteners such as bolts and nuts.

In order to remove the cultivator blade 35 from the blade holder 33, the cultivator blade 35 is hit by a wooden hammer or the like to rotate the shank 36 in the opposite direction to release the fitting pressure of the first contacting portions "f" and the second contacting portions "g", and then the stopper pin 7 is removed from the pin holes 48 of the blade holder 33 and the pin hole 55 of the shank 36. In this way, since the fitting pressure releasing portions 41 and 42 which do not contact with the shank 36 are provided in the cavity 34 of the blade holder 33, the cultivator blade 35 can be easily removed.

Since the blade holder 33 is formed as a single body by processing spring steel, the blade holder 33 has high tensile strength and high elastic efficiency against the reaction force. Thus, the lifetime of the blade holder 33 is prolonged.

Figure 11:
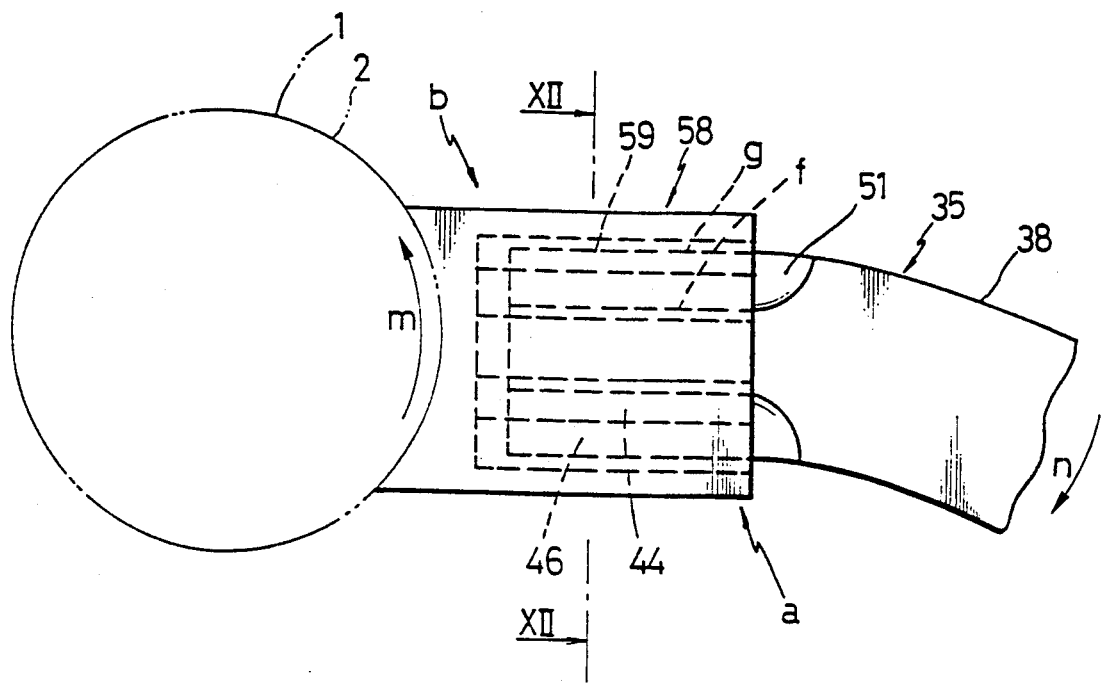
FIG. 11 is a side view showing a third embodiment of the present invention.
Figure 12:
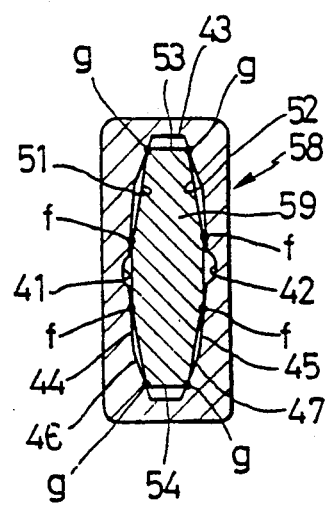
FIG. 12 is a cross-sectional view taken along the line XII—XII shown in FIG. 11.

FIGS. 11 and 12 show a third embodiment of the present invention. The structural parts which bear the same numerals as the structural parts in the second embodiment have exactly the same functions, so a more detailed explanation will be omitted here.

In the third embodiment, the stopper pin 7 for connecting the cultivator blade 35 and the blade holder 33 as shown in the second embodiment is omitted. Relative thereto, the pin holes 48 of the blade holder 33 and the pin hole 55 of the shank 36 are also omitted. Thus, the cultivator blade supporting structure of the third embodiment is simplified more than that of the second embodiment.

In the third embodiment, the numerals 58 and 59 denote a blade holder and a shank, respectively. The shank 59 of the cultivator blade 35 is inserted in the cavity 34 of the blade holder 58. Then, the cultivator blade 35 is hit by a wooden hammer or the like to rotate the cultivator blade 35 in a direction indicated by the arrow "n" in FIG. 11 (that is, in a direction which the cultivator blade 35 receives a reaction force when the cultivator blade 35 rotates to cultivate the ground) so that the first contacting portions "f" and the second contacting portions "g" of the shank 59 on the lower face side "a" are wedged into the first inclined interior surfaces 44 and 45 and the second inclined interior surfaces 46 and 47, respectively, and the first contacting portions "f" and the second contacting portions "g" of the shank 59 on the upper back side "b" are wedged into the first inclined interior surfaces 44 and 45 and the second inclined interior surfaces 46 and 47, respectively. Thus, the cultivator blade 35 is supported to the blade holder 58.

In this situation, when the cultivator blade 35 starts to cultivate the ground, the reaction force is transmitted to the shank 59 through the blade portion 38 of the cultivator blade 35, so that the first contacting portions "f" and the second contacting portions "g" on the lower face side "a" and the upper back side "b" are further wedged into the first inclined interior surfaces 44 and 45 and the second inclined interior surfaces 46 and 47 of the blade holder 58, respectively. Thus, the cultivator blade 35 is firmly and reliably supported to the blade holder 58 without using a stopper pin.

In order to remove the cultivator blade 35 from the blade holder 58, the cultivator blade 35 is hit by a wooden hammer or the like to rotate the shank 59 in an opposite direction to release the fitting pressure of the first contacting portions "f" and the second contacting portions "g". In this way, the cultivator blade 35 can be easily removed from the blade holder 58.

As can be readily understood from the above explanation, the third embodiment has the same effects as the second embodiment. In addition, the cultivator blade supporting structure of the third embodiment has further effects in that the structure for supporting the cultivator blade is simplified by omitting the stopper pin and that the cultivator blade 35 can be easily attached to and removed from the blade holder 58.

Figure 13:
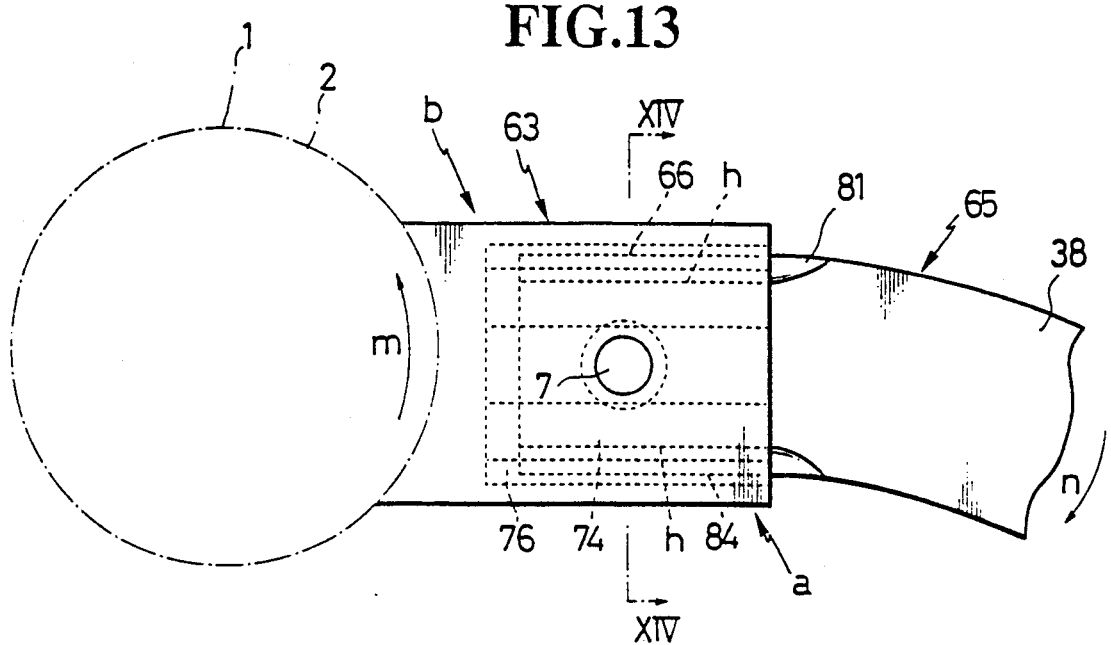
FIG. 13 is a side view showing a fourth embodiment of the present invention.
Figure 14:
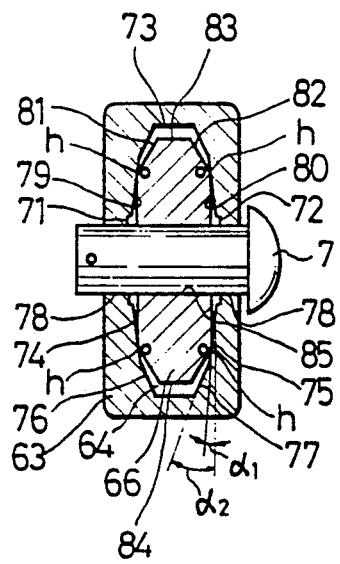
FIG. 14 is a cross-sectional view taken along the line XIV—XIV shown in FIG. 13.

FIGS. 13 and 14 show a fourth embodiment of the present invention. The numeral 1 denotes a cultivator rotational shaft. A periphery 2 of the rotational shaft 1 is provided radially with a plurality of blade holders 63 which are welded thereto and spaced properly apart from each other.

Each blade holder 63 is formed as a single body by processing medium or high carbon steel or special steel (steel including a special element, such as Si, Mn, Cr, Ni, V, etc.). In this embodiment, the blade holder 63 is formed by press-processing, for example, spring steel by hot working (700° C. or more) or warm working (200°-700° C.) with the use of special lubricants. Further, the blade holder 63 is hardened and tempered by heating and sudden cooling to improve toughness.

The numeral 64 is a cavity of the blade holder 63. The blade holder 63 has fitting pressure releasing portions 71 and 72 at an intermediate height in symmetrical positions on the right and left side faces of the blade holder 63. The blade holder also includes a plurality of inclined side surfaces having different inclination angles so that the thickness of the side walls of the blade holder 63 becomes thicker from the fitting pressure releasing portions 71 and 72 toward stop surfaces 73. In this embodiment, the blade holder 63 is provided with first confronting oppositely inclined interior surfaces 74 and 75 having a proper inclination angle $\alpha 1$ in the upper and lower directions from the both ends of the fitting pressure releasing portions 71 and 72, and second confronting oppositely inclined interior surfaces 76 and 77 having a inclination angle $\alpha 2$ from the upper and lower portions of the first inclined interior surfaces 74 and 75 toward the stop surfaces 73, with $\alpha 2 > \alpha 1$. Further, pin holes 78 for inserting a stopper pin 7 therein are provided at the center portions of the right and left sides of the blade holder 63.

The numeral 65 denotes a cultivator blade comprising the shank 66 and a blade portion 68. A pin hole 85 is provided at the center portion of the shank 66, which corresponds to the pin holes 78 of the blade holder 63.

The intermediate body of the shank 66 on the right and left side portions is formed with parallel side surfaces 79 and 80. The upper and lower ends of the parallel side surfaces 79 and 80 terminate at inclined side surfaces 81 and 82 which have angles of inclination larger than those of the second inclined interior faces 76 and 77 of the blade holder 63. The upper and lower ends of the inclined side surfaces 81 and 82 are formed into parallel end surfaces 83 and 84, each having a width narrower than the width of the stop surfaces 73 of the blade holder 63.

The shank 66 of the cultivator blade 65 is inserted into the cavity 64 of the blade holder 63, and the stopper pin 7 is inserted into the pin holes 78 of the blade holder 63 and the pin hole 85 of the shank 66 so that the cultivator blade 65 is removably fixed to the blade holder 63. A cotter pin (not shown) is fitted to the stopper pin 7 to prevent the accidental removal thereof. The shank 66, at contacting portions "h" which are intersections of the parallel side surfaces 79 and 80 and the inclined side surfaces 81 and 82, abuts the first inclined interior surfaces 74 and 75 of the blade holder 63.

The operation of the fourth embodiment will be described hereinafter. A cultivator is driven to rotate the cultivator shaft 1 by a motor (not shown). When the cultivator blade 65 starts to cultivate the ground, the cultivator blade 65 receives a reaction force from the ground through the blade portion 68. As a result, the shank 66 is rotated around the stopper pin 7 relative to the blade holder 63 in a direction indicated by the arrow "n" in FIG. 13 so that the contacting portions "h" on the lower face side "a" and the contacting poritons "h" on the upper back side "b" are wedged into the first inclined interior surfaces 74 and 75, respectively and supported. If the cultivator blade 65 receives a large reaction force from the ground, the shank 66 is further rotated around the stopper pin 7 in the direction indicated by an arrow "n", whereby the contact portions "h" of the shank 66 are gradually wedged from the first inclined interior surfaces 74 and 75 into the second inclined interior surfaces 76 and 77. If a predetermined external force is applied to the cultivator blade 65, the upper and lower end surfaces 83 and 84 of the shank 66 abut the stop surfaces 73 of the blade holder 63, whereby the extent of rotation of the shank 66 relative to the blade holder 63 is limited.

In this embodiment, since the first inclined interior surfaces 74 and 75 are inclined at a gentle grade $\alpha 1$, the contacting portions "h" can be smoothly wedged into the first inclined interior surfaces 74 and 75, whereby the blade holder 63 at the intermediate height portions near the stopper pin 7 is resiliently enlarged along the axial direction of the stopper pin 7. And, since the inclination angle $\alpha 2$ of the second inclined interior surfaces 76 and 77 is larger than the inclination angle $\alpha 1$ of the first inclined interior surfaces 74 and 75, when the contacting portions "h" are gradually wedged into the second inclined interior surfaces 76 and 77, the contacting portions "h" are pressed against the second inclined interior surfaces 76 and 77 with a stronger fitting force, but the extent of resilient deformation of the blade holder 63 along the axial direction of the stopper pin 7 is decreased. Thus, the cultivator blade 65 can be firmly supported in the blade holder 63 while preventing cracking thereof due to a high levels of the resilient deformation.

In order to remove the cultivator blade 65 from the blade holder 63, the cultivator blade 65 is hit by a wooden hammer or the like to rotate the shank 66 in the opposite direction to release the fitting pressure of the contacting portions "h", and then the stopper pin 7 is removed from the pin holes 78 of the blade holder 63 and the pin hole 85 of the shank 66. In this way, since the fitting pressure releasing portions 71 and 72 which do not contact with the shank 66 are provided in the cavity 64 of the blade holder 63, the cultivator blade 65 can be easily removed.

As explained above, this embodiment shows the cultivator supporting structure having the stopper pin 7, but the stopper pin 7 can be omitted as was done in the third embodiment.

Without being limited to the above embodiments, it is of course possible to form the inclined surfaces of the cavity of the blade holder to polygonal inclined surfaces or circular arc surfaces.

Although the invention has been described in a structure for supporting a cultivator blade, the blade supporting structure can also be used for a ground leveling apparatus for leveling waste ground in a plowed field, a horse-racing track, etc.

Although the invention has been described in its preferred embodiments, it is to be understood that various changes and modifications may be made without departing from the spirit and scope of the invention as defined in the appended claims.

What is claimed is:

1. A supporting structure for a cultivator blade of the type having a blade portion with a shank, comprising:
    a rotational driving shaft; and
    at least one blade holder fixed to and extending radially from said shaft, said blade holder having an elongated cavity suitably dimensioned and configured to receive said shank therein,
    wherein said cavity is defined by top and bottom interior surfaces, pairs of first inwardly inclined horizontally opposed interior side surfaces extending from a mid portion of the cavity upwardly and downwardly respectively, said first inwardly inclined interior side surfaces being inclined toward each other at a first angle with respect to a vertical plane bisecting said cavity, and pairs of second inwardly inclined horizontally opposed interior side surfaces extending respectively from the upper and lower ends of said first inwardly inclined interior side surfaces toward said top and bottom interior surfaces, said second inclined interior side surfaces being inclined toward each other at a second angle with respect to said vertical plane, said second angle being larger than said first angle; and
    wherein said shank has upper and lower end surfaces and inclined exterior side surfaces inclined toward each other at a third angle which is larger than the first and second angles of the first and second inwardly inclined interior side surfaces of said blade holder, said shank being further provided with parallel side surfaces spaced apart from said first inwardly inclined interior surfaces of said blade holder so that contacting portions which are intersections of said inclined side surfaces and said parallel side surfaces are gradually wedged from said pairs of first inwardly inclined interior side surfaces of said blade holder into said pairs of second inwardly inclined interior side surfaces of said blade holder due to a reaction force from the ground when said cultivator blade rotates to cultivate the ground.

2. The supporting structure of claim 1, wherein said blade holder is formed as a single body by forging medium or high carbon steel having high tensile strength and high elastic efficiency.

3. The supporting structure of claim 1, wherein said blade holder is formed as a single body by forging special steel having high tensile strength and high elastic efficiency.

4. The supporting structure of claim 1, wherein said blade holder includes parallel stop surfaces and said shank includes parallel end surfaces having a width narrower than the width of said stop surfaces so that said parallel end surfaces can abut said stop surfaces to limit the extent of rotation of said shank relative to said holder.

5. The supporting structure of claim 1 further comprising a pin extending through aligned apertures in said holder and said shank received in said cavity, said cavity and said shank being dimensioned to accommodate limited rotational movement of said shank relative to said blade holder about the axis of said pin.

6. The supporting structure of claim 1, wherein said first and second inwardly inclined interior surfaces are formed in circular arc shapes.

7. A supporting structure for a cultivator blade of the type having a blade portion with a shank, comprising:
    a rotational driving shaft; and
    at least one blade holder fixed to and extending radially from said shaft, said blade holder having an elongated cavity suitably dimensioned and configured to receive said shank therein,
    wherein at least a part of said cavity is defined by top and bottom interior surfaces, pairs of first inwardly inclined horizontally opposed interior surfaces being provided upwardly and downwardly from about an intermediate height of the cavity so that said first inwardly inclined interior faces are inclined toward each other at an angle with respect to a vertical plane and pairs of second inwardly inclined horizontally opposed interior surfaces being provided from the upper and lower ends of said first inwardly inclined interior surfaces toward said top and bottom interior surfaces, said second inwardly inclined interior surfaces having an inclination angle larger than that of said first inwardly inclined interior surfaces with respect to the vertical plane; and wherein said shank has upper and lower end surfaces, inclined side surfaces having an inclination angle which is larger than that of said first inwardly inclined interior surfaces of said blade holder, but which is smaller than that of said second inwardly inclined interior surfaces of said blade holder, and side surfaces other than said inclined side surfaces being spaced apart from said first inwardly inclined interior surfaces of said blade holder so that first contacting portions which are intersections of said inclined side surfaces and said surfaces other than said inclined side surfaces are wedged between and into said pairs of first inwardly inclined interior surfaces of said blade holder ant that second contacting portions which are intersections of said inclined side surfaces and said upper and lower end surfaces are wedged between and into said pairs of second inwardly inclined interior surfaces of said blade holder, when said cultivator blade rotates to cultivate the ground.

8. A supporting structure for a cultivator blade of the type having a blade portion with a shank, comprising:

a rotational driving shaft; and at least one blade holder fixed to an extending radially from said shaft, said blade holder having an elongated cavity suitably dimensioned and configured to receive said shank therein, wherein at least a part of said cavity is defined by top and bottom interior surfaces, pairs of first inwardly inclined horizontally opposed interior surfaces being provided upwardly and downwardly from about an intermediate height of the cavity so that said first inclined interior faces are inclined toward each other at an angle with respect to a vertical plane and pairs of second inwardly inclined horizontally opposed interior surfaces being provided from the upper and lower ends of said first inwardly inclined interior surfaces toward said top and bottom interior surfaces, said second inwardly inclined interior surfaces having an inclination angle larger than that of said first inwardly inclined interior surfaces with respect to the vertical plane; and wherein said cavity of said blade holder is provided with fitting pressure releasing portions at an intermediate height in symmetrical positions on right and left side faces of said blade holder so that said cultivator blade can be easily attached to and removed from said blade holder.

9. The supporting structure of claim 8, wherein said shank has upper and lower end surfaces, inclined side surfaces having an inclination angle which is larger than those of said first and second inwardly inclined interior surfaces of said blade holder and side surfaces other than said inclined side surfaces being spaced apart from said first inwardly inclined interior surfaces of said blade holder so that contacting portions which are intersections of said inclined side surfaces and the side surfaces other than said inclined side surfaces are wedged between and into said pairs of first inwardly inclined interior surfaces of said blade holder due to a reaction force from the ground when said cultivator blade rotates to cultivate the ground.

10. A supporting structure for a cultivator blade of the type having a blade portion with a shank, comprising:

a rotatable driving shaft; and a blade holder fixed to and extending radially from said shaft, said blade holder having an elongated cavity suitably dimensioned and configured to receive said shank therein, wherein said blade holder is formed as a single body by forging medium or high carbon steel or special steel having high tensile strength and high elastic efficiency;

said cavity is defined by top and bottom interior surfaces, fitting pressure releasing portions, pairs of first inwardly inclined horizontally opposed interior surfaces and pairs of second inwardly inclined horizontally opposed interior surfaces having an inclination angle with respect to a vertical plane larger than that of said first inwardly inclined interior surfaces, said fitting pressure releasing portions being provided at an intermediate height in symmetrical positions on right and left side faces of said blade holder, said first inwardly inclined interior surfaces being provided upwardly and downwardly from upper and lower ends of said fitting pressure releasing portions so that said first inclined interior faces are inclined toward each other at an angle with respect to the vertical plane and said second inwardly inclined interior surfaces being provided from upper and lower ends of said first inwardly inclined interior surfaces toward said top and bottom interior surfaces; and said shank at upper and lower parts thereof has inclined side surfaces having an inclination angle which is larger than those of said first and second interior surfaces of said blade holder with respect to the vertical plane and side surfaces other than said inclined said surfaces are spaced apart from said first inwardly inclined interior surfaces of said blade holder with a certain clearance so that contacting portions which are intersections of said inclined side surfaces and the side surfaces other than said inclined side surfaces are wedged between and into said pairs of first inwardly inclined interior surfaces of said blade holder when said cultivator blade rotates to cultivate the ground.

11. A supporting structure for a cultivator blade of the type having a blade portion with a shank, comprising:

a rotational driving shaft; and at least one blade holder fixed to and extending radially from said shaft, said blade holder having an elongated cavity suitably dimensioned and configured to receive said shank therein, wherein at least a part of said cavity is defined by top and bottom interior surfaces, pairs of first inwardly inclined horizontally opposed interior surfaces being provided upwardly and downwardly from about an intermediate height of the cavity so that said first inclined interior faces are inclined toward each other at an angle with respect to a vertical plane and pairs of second inwardly inclined horizontally opposed interior surfaces being provided from the upper and lower ends of said first inwardly inclined interior surfaces toward said top and bottom interior surfaces, said second inwardly inclined interior surfaces having an inclination angle larger than that of said first inwardly inclined interior surfaces with respect to the vertical plane; and wherein cross-sectional width of said shank perpendicular to a plane including a longitudinal axis thereof is wider at upper and lower parts thereof than cross-sectional width between said confronting first inwardly inclined interior surfaces of said blade holder and is narrower at the intermediate parts thereof than said cross-sectional width therebetween so that contacting portions provided at upper and lower parts of said shank are gradually wedged from said pairs of second inwardly inclined interior surfaces of said blade holder due to a reaction force from the ground when said cultivator blade rotates to cultivate the ground.

* * * * *